United States Patent
Ito et al.

(10) Patent No.: US 12,351,475 B2
(45) Date of Patent: Jul. 8, 2025

(54) SYSTEM FOR PRODUCING MAGNESIUM CHLORIDE AQUEOUS SOLUTION AND SYSTEM FOR PRODUCING MAGNESIUM

(71) Applicant: MITSUBISHI HEAVY INDUSTRIES, LTD., Tokyo (JP)

(72) Inventors: Yoshiaki Ito, Tokyo (JP); Kazuhisa Takeuchi, Tokyo (JP); Masashi Kiyosawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 571 days.

(21) Appl. No.: 17/790,639

(22) PCT Filed: Dec. 14, 2020

(86) PCT No.: PCT/JP2020/046592
§ 371 (c)(1),
(2) Date: Jul. 1, 2022

(87) PCT Pub. No.: WO2021/140840
PCT Pub. Date: Jul. 15, 2021

(65) Prior Publication Data
US 2023/0030186 A1    Feb. 2, 2023

(30) Foreign Application Priority Data
Jan. 8, 2020   (JP) ................. 2020-001483

(51) Int. Cl.
*C25C 3/04* (2006.01)
*C01F 5/32* (2006.01)
*C01F 5/34* (2006.01)

(52) U.S. Cl.
CPC .............. *C01F 5/34* (2013.01); *C01F 5/32* (2013.01); *C25C 3/04* (2013.01)

(58) Field of Classification Search
CPC .................. C25C 3/04; C01F 5/32; C01F 5/34
See application file for complete search history.

(56) References Cited

U.S. PATENT DOCUMENTS

| | | | | |
|---|---|---|---|---|
| 5,089,094 A | * | 2/1992 | Ogasawara | C25C 3/04 423/178 |
| 6,020,533 A | * | 2/2000 | Lewis | B01J 27/187 585/443 |
| 8,728,418 B2 | * | 5/2014 | Miyoshi | B82Y 30/00 423/155 |

FOREIGN PATENT DOCUMENTS

JP    H06-254356 A    9/1994

OTHER PUBLICATIONS

Komatsu, Ryuzo, Smelting of Magnesium, Journal of Japan Institute of Light Metals, vol. 18, No. 2, 1968, partial translation. (12 pages) cited in specification.

(Continued)

*Primary Examiner* — Robert M Kunemund
(74) *Attorney, Agent, or Firm* — WHDA, LLP

(57) ABSTRACT

A system for producing a magnesium chloride aqueous solution includes a crystallization unit configured to generate reaction slurry in which particles of magnesium hydroxide are dispersed by adding a sodium hydroxide aqueous solution to water to be treated, a precipitation unit configured to store reaction slurry, precipitate particles and separate the reaction slurry into recovered slurry and a separated liquid, a removal unit configured to remove divalent cations from the water to be treated or the separated liquid to generate a reaction liquid, an acid-alkali generation unit configured to generate a sodium hydroxide aqueous solution and hydrochloric acid from the reaction liquid, and a reaction unit configured to generate a magnesium chloride aqueous solution by adding hydrochloric acid to the recovered slurry. The acid-alkali generation unit has a main body (Continued)

section configured to generate a sodium hydroxide aqueous solution and hydrochloric acid from the reaction liquid.

6 Claims, 3 Drawing Sheets

(56) References Cited

OTHER PUBLICATIONS

International Search Report dated Mar. 2, 2021, issued in counterpart Application No. PCT/JP2020/046592, with English Translation. (4 pages).
Written Opinion dated Mar. 2, 2021, issued in counterpart Application No. PCT/JP2020/046592, with English Translation. (6 pages).

* cited by examiner

SYSTEM FOR PRODUCING MAGNESIUM CHLORIDE AQUEOUS SOLUTION AND SYSTEM FOR PRODUCING MAGNESIUM

TECHNICAL FIELD

The present disclosure relates to a system for producing a magnesium chloride aqueous solution and a system for producing magnesium.

Priority is claimed on Japanese Patent Application No. 2020-001483, filed Jan. 8, 2020, the content of which is incorporated herein by reference.

BACKGROUND ART

In the related art, as a method of recovering magnesium dissolved in seawater, a method referred to as a Dow method is known. In the Dow method, first, an alkali is added to the seawater to obtain magnesium hydroxide ($Mg(OH)_2$). Next, hydrochloric acid is added to the obtained $Mg(OH)_2$ to obtain magnesium chloride ($MgCl_2$). Further, metal magnesium is obtained by performing molten salt electrolysis on the obtained $MgCl_2$ (for example, see Non Patent Literature 1).

CITATION LIST

Non Patent Literature

[Non Patent Literature 1]
Journal of Light Metal, Vol. 18, No. 2 (1968)

SUMMARY OF INVENTION

Technical Problem

However, in the Dow method, a large quantity of an alkali is used in the reaction to obtain $Mg(OH)_2$, and a large quantity of hydrochloric acid is used in the reaction to obtain $MgCl_2$. The costs of these chemicals are factors in increasing the cost of producing magnesium from seawater. For this reason, there is a need for improvement that enables reduction of manufacturing costs.

In consideration of the above-mentioned circumstances, the present disclosure is directed to providing a system for producing a magnesium chloride aqueous solution capable of reducing costs related to chemicals in comparison with the method in the related art. In addition, the present disclosure is directed to providing a system for producing magnesium capable of reducing costs related to chemicals in comparison with the method in the related art.

Solution to Problem

In order to achieve the aforementioned objects, a system for producing a magnesium chloride aqueous solution according to the present disclosure includes a crystallization unit; a precipitation unit connected to the crystallization unit; a removal unit connected to the precipitation unit; an acid-alkali generation unit connected to the removal unit; and a reaction unit connected to the precipitation unit, the crystallization unit crystallizes magnesium hydroxide by adding a sodium hydroxide aqueous solution to water to be treated using seawater as a raw material, and generates reaction slurry in which particles of the magnesium hydroxide are dispersed, the precipitation unit stores the reaction slurry to precipitate the particles, and separates the reaction slurry into a recovered slurry containing the particles at a high concentration and a separated liquid containing the particles at a low concentration, the removal unit removes divalent cations from the water to be treated or the separated liquid to generate a reaction liquid, the acid-alkali generation unit generates a sodium hydroxide aqueous solution and hydrochloric acid from the reaction liquid, the reaction unit adds the hydrochloric acid to the recovered slurry and generates a magnesium chloride aqueous solution, and the acid-alkali generation unit has: a main body section configured to generate a sodium hydroxide aqueous solution and hydrochloric acid from the reaction liquid; a first connection unit configured to connect the main body section and the crystallization unit and supply the sodium hydroxide aqueous solution to the crystallization unit; and a second connection unit configured to connect the main body section and the reaction unit and supply the hydrochloric acid to the reaction unit.

Advantageous Effects of Invention

According to the present disclosure, it is possible to provide a system for producing a magnesium chloride aqueous solution capable of reducing costs related to chemicals in comparison with the related art. In addition, it is possible to provide a system for producing magnesium capable of reducing costs related to chemicals in comparison with the related art.

DESCRIPTION OF EMBODIMENTS

First Embodiment

Hereinafter, a system for producing a magnesium chloride aqueous solution and a system for producing magnesium according to a first embodiment of the present disclosure will be described with reference to FIG. 1. Further, in all the drawings below, dimensions, ratios, or the like of components are appropriately different in order to make the drawings easier to see.

Figure 1:
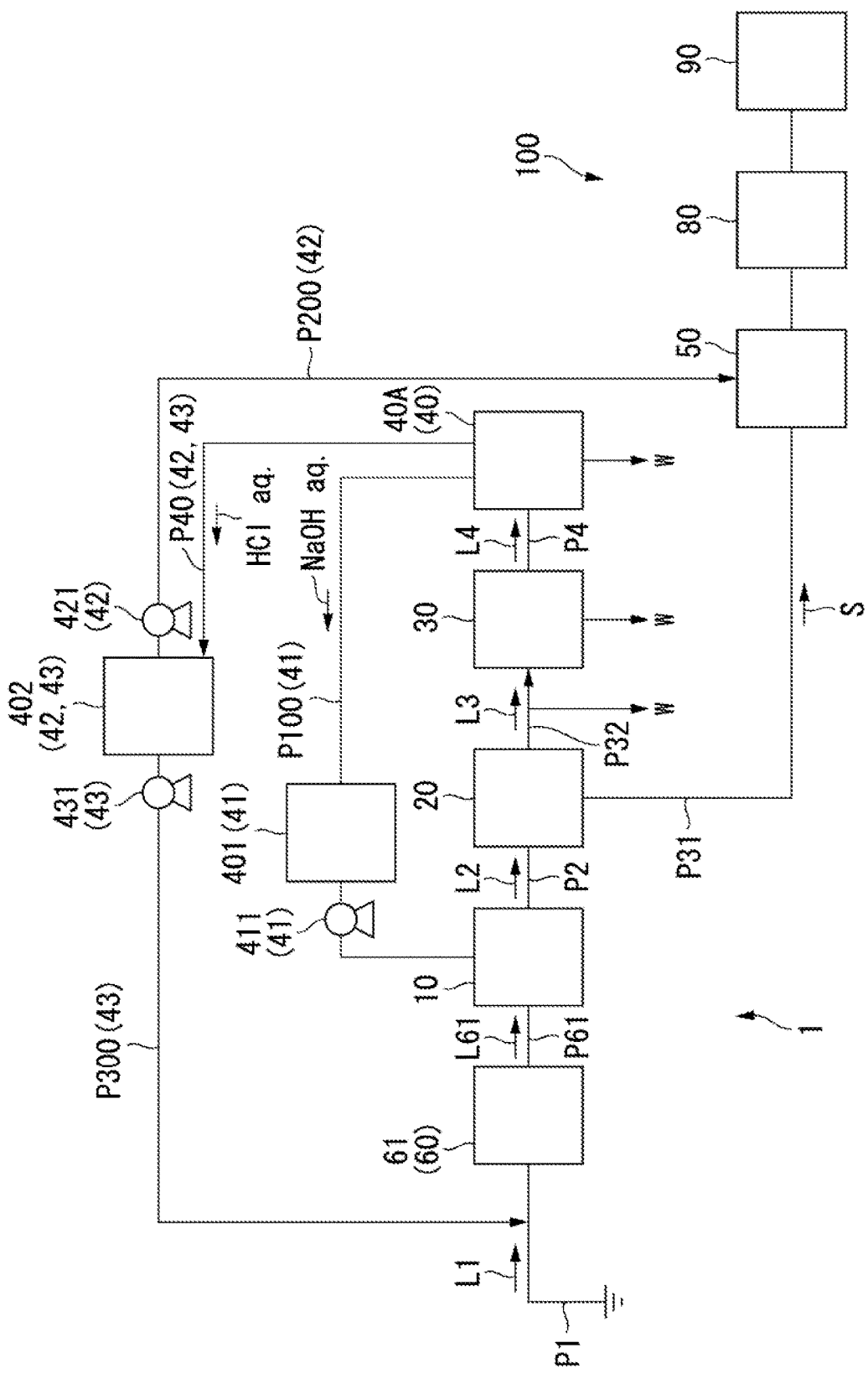
FIG. 1 is a schematic diagram showing a system for producing a magnesium chloride aqueous solution and a system for producing magnesium according to a first embodiment of the present disclosure.

FIG. 1 is a schematic diagram showing a system 1 for producing a magnesium chloride aqueous solution and a system 100 for producing magnesium according to the first embodiment of the present disclosure.

(System for Producing Magnesium Chloride Aqueous Solution)

The system 1 for producing a magnesium chloride aqueous solution includes a crystallization unit 10, a precipitation unit 20, a removal unit 30, an acid-alkali generation unit 40, a reaction unit 50, and a pre-processing unit 60.

(Pre-Processing Unit (Decarbonizing Unit))

The pre-processing unit 60 is connected to the crystallization unit 10 upstream from the crystallization unit 10. In the pre-processing unit 60, water to be treated L1 supplied to the crystallization unit 10 is previously processed, and the water to be treated L1 is adjusted to a state suitable for processing after the crystallization unit 10. In the system 1 for producing a magnesium chloride aqueous solution of the embodiment, the pre-processing unit 60 has a decarbonizing unit 61 configured to remove at least some carbonic acid dissolved in the water to be treated L1.

The water to be treated includes not only seawater but also enriched seawater obtained by removing water from the seawater. For example, the enriched seawater corresponds to enriched liquid generated by performing reverse osmosis membrane processing of the seawater and separating the water.

Further, the water to be treated also includes a liquid obtained by performing decarbonizing processing with respect to the seawater or the enriched seawater and reducing carbonic acid.

The decarbonizing unit 61 can employ a known configuration. For example, the decarbonizing unit 61 may be exemplified as a decarbonator configured to remove the carbonic acid included in the water to be treated L1 by adding hydrochloric acid (HCl aq.) to the water to be treated L1 and then aerating the water to be treated L1. By decarbonizing the water to be treated L1, carbonate is unlikely to be generated in the process, and it is possible to stably operate the system 1 for producing a magnesium chloride aqueous solution for a long period of time.

A pipeline P1 and a pipeline P61 are connected to the decarbonizing unit 61. The water to be treated L1 is supplied to the decarbonizing unit 61 via the pipeline P1. In addition, water to be treated (water to be treated L61) decarbonized by the decarbonizing unit 61 is supplied to the crystallization unit 10 via the pipeline P61.

(Crystallization Unit)

The crystallization unit 10 is an apparatus configured to crystallize $Mg(OH)_2$ by adding a sodium hydroxide aqueous solution (NaOH aq.) to the water to be treated L61. The water to be treated L61 is supplied to the crystallization unit 10 via the pipeline P61.

In the crystallization unit 10, reaction slurry L2 in which $Mg(OH)_2$ particles are dispersed is generated.

(Precipitation Unit)

The precipitation unit 20 is connected to the crystallization unit 10 via a pipeline P2. The reaction slurry L2 generated in the crystallization unit 10 is supplied to the precipitation unit 20 via the pipeline P2.

The precipitation unit 20 can employ a precipitation tank configured to store the reaction slurry L2 and precipitate $Mg(OH)_2$ particles. The precipitation unit 20 separates the reaction slurry L2 into recovered slurry S containing $Mg(OH)_2$ particles at a high concentration, and a separated liquid L3 containing $Mg(OH)_2$ particles at a low concentration. A large quantity of calcium ions ($Ca^{2+}$) remains in the separated liquid L3.

(Reaction Unit)

The reaction unit 50 is connected to the precipitation unit 20 via a pipeline P31. The recovered slurry S generated in the precipitation unit 20 is supplied to the reaction unit 50 via the pipeline P31.

The reaction unit 50 adds hydrochloric acid to the recovered slurry S to generate a magnesium chloride aqueous solution.

(Removal Unit)

The removal unit 30 is connected to the precipitation unit 20 via a pipeline P32. The separated liquid L3 generated in the precipitation unit 20 is supplied to the removal unit 30 via the pipeline P32.

The removal unit 30 removes at least some divalent cations contained in the separated liquid L3, and generates a reaction liquid L4 with a low divalent cation concentration. As the divalent cations removed from the separated liquid L3, calcium ions are representatively exemplified.

As the removal unit 30, a known electrodialysis tank configured to selectively remove the divalent cations can be employed.

In addition, as the removal unit 30, a nano-filtering membrane that separates the divalent cations may be used.

In addition, as the removal unit 30, a reaction tank configured to add sulfate ions to the separated liquid L3 may be used. When the sulfate ions are added to the separated liquid L3, $Ca^{2+}$ and $SO_4^{2-}$ react with each other, and thus $CaSO_4$ is generated and precipitated. It is possible to reduce the calcium ion concentration in the separated liquid L3 by removing the generated $CaSO_4$.

(Acid-Alkali Generation Unit)

The acid-alkali generation unit 40 is connected to the removal unit 30 via a pipeline P4. The reaction liquid L4 generated in the removal unit 30 is supplied to the acid-alkali generation unit 40 via the pipeline P4.

The acid-alkali generation unit 40 has a main body section 40A, a first connection unit 41, a second connection unit 42, and a third connection unit 43.

The main body section 40A generates a sodium hydroxide aqueous solution and hydrochloric acid from the reaction liquid L4. The main body section 40A can employ, for example, a known bipolar membrane or electrolyzer.

In the bipolar membrane, the hydrochloric acid and the sodium hydroxide aqueous solution are generated on the basis of the following reaction equation.

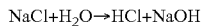
$$NaCl+H_2O \rightarrow HCl+NaOH$$

In the electrolyzer, the hydrochloric acid and the sodium hydroxide aqueous solution are generated on the basis of the following reaction equation.

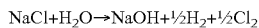
$$NaCl+H_2O \rightarrow NaOH+\tfrac{1}{2}H_2+\tfrac{1}{2}Cl_2$$

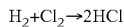
$$H_2+Cl_2 \rightarrow 2HCl$$

The reaction liquid L4 supplied to the acid-alkali generation unit 40 has reduced divalent cations containing calcium ions in the removal unit 30. Accordingly, in the acid-alkali generation unit 40, scale components such as calcium sulfate, calcium hydroxide, and the like are less likely to precipitate, and a stable continuous operation becomes possible.

The first connection unit 41 has a pipeline P100, a reservoir 401, and a supply apparatus 411.

The pipeline P100 connects the main body section 40A and the crystallization unit 10.

The reservoir 401 stores a sodium hydroxide aqueous solution generated in the main body section 40A.

The supply apparatus 411 supplies the sodium hydroxide aqueous solution stored in the reservoir 401 to the crystallization unit 10.

The second connection unit 42 has a pipeline P40, a reservoir 402, a pipeline P200, and a supply apparatus 421.

The pipeline P40 connects the main body section 40A and the reservoir 402.

The reservoir 402 stores the hydrochloric acid generated in the main body section 40A.

The pipeline P200 connects the reservoir 402 and the reaction unit 50.

The supply apparatus 421 supplies the hydrochloric acid stored in the reservoir 402 to the reaction unit 50 via the pipeline P200.

The third connection unit 43 has the pipeline P40, a reservoir 402, a pipeline P300, and a supply apparatus 431.

The pipeline P300 connects a reservoir 403 and the decarbonizing unit 61.

The supply apparatus 431 supplies the hydrochloric acid stored in the reservoir 403 to the decarbonizing unit 61 via the pipeline P300.

(Effects)

As described above, in the system 1 for producing a magnesium chloride aqueous solution of the embodiment, the hydrochloric acid and the sodium hydroxide aqueous solution are generated in the acid-alkali generation unit 40 and supplied to the crystallization unit 10, the reaction unit 50 and the decarbonizing unit 61. That is, in the system 1 for producing a magnesium chloride aqueous solution, a sodium hydroxide aqueous solution used in the crystallization unit 10 and the hydrochloric acid used in the reaction unit 50 and the decarbonizing unit 61 are generated in the system 1 for producing a magnesium chloride aqueous solution.

For this reason, in the system 1 for producing a magnesium chloride aqueous solution of the embodiment, it is possible to reduce costs related to the chemicals in comparison with the method in the related art.

(System for Producing Magnesium)

The system 100 for producing magnesium has a generation unit 80 and an electrolysis unit 90, in addition to the system 1 for producing a magnesium chloride aqueous solution.

(Generation Unit)

The generation unit 80 is an apparatus configured to separate moisture from the magnesium chloride aqueous solution to obtain $MgCl_2$. In the generation unit 80, the magnesium chloride aqueous solution can be processed through heating, decompression, perflation and a combination thereof, and a configuration that evaporates the moisture can be employed.

$MgCl_2$ generated in the generation unit 80 is supplied to the electrolysis unit 90.

(Electrolysis Unit)

The electrolysis unit 90 is an apparatus configured to perform molten salt electrolysis of $MgCl_2$ and obtain metal magnesium. As a configuration of the electrolysis unit 90, known molten salt electrolysis equipment can be employed.

According to the above-mentioned system 1 for producing a magnesium chloride aqueous solution, it is possible to produce the magnesium chloride aqueous solution while the costs related to the chemicals are reduced in comparison with the method in the related art.

In addition, according to the above-mentioned system 100 for producing magnesium, it is possible to produce magnesium while the costs related to the chemicals are reduced in comparison with the method in the related art.

Second Embodiment

Figure 2:
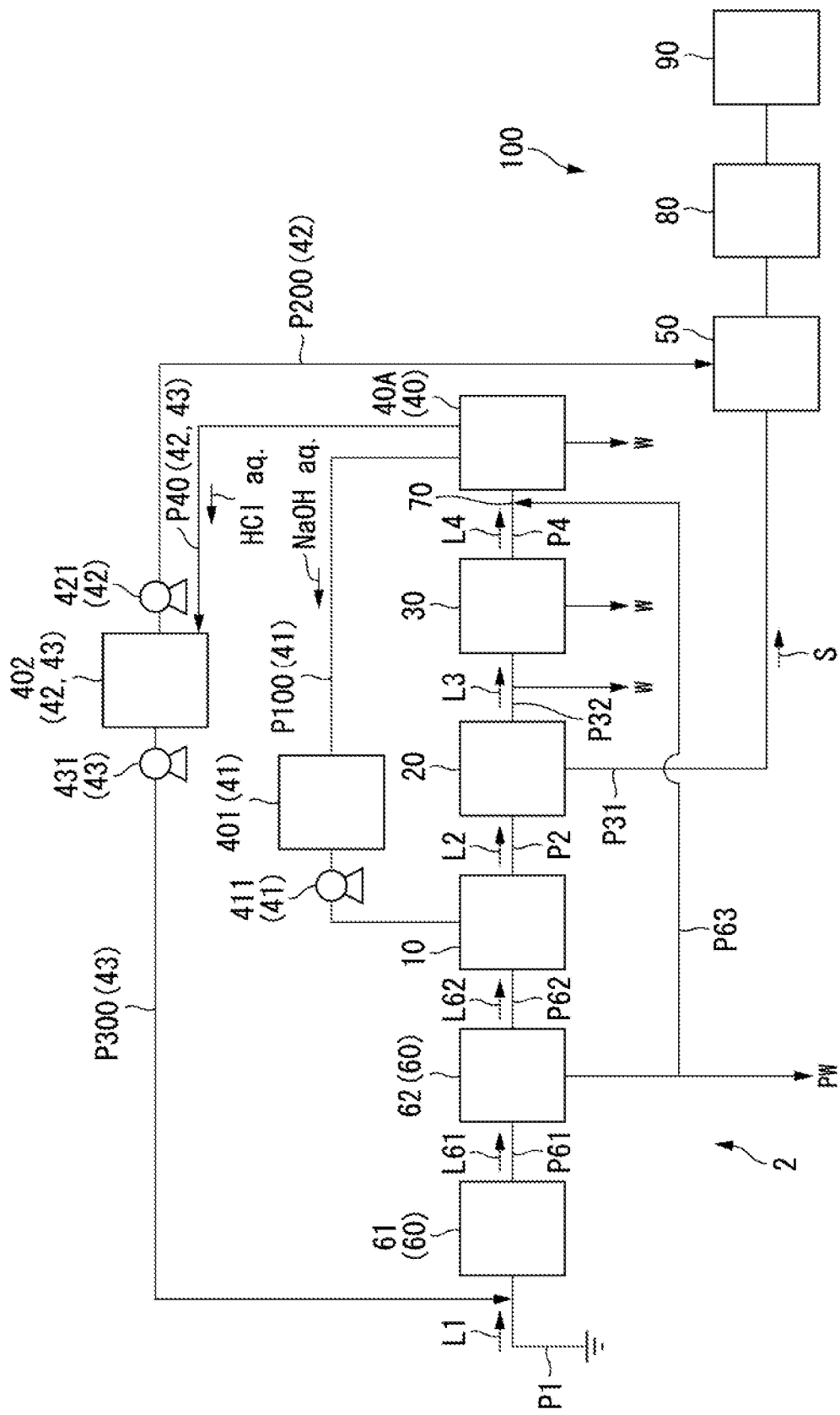
FIG. 2 is a view for describing a system for producing a magnesium chloride aqueous solution and a system for producing magnesium according to a second embodiment of the present disclosure.

FIG. 2 is a view for describing a system for producing a magnesium chloride aqueous solution and a system for producing magnesium according to a second embodiment of the present disclosure. The system for producing a magnesium chloride aqueous solution and the system for producing magnesium of the embodiment are partially the same as the system for producing a magnesium chloride aqueous solution and the system for producing magnesium of the first embodiment. Accordingly, in the embodiment, components that are the same as those described in the first embodiment are designated by the same reference signs, and detailed description thereof will be omitted.

(System for Producing Magnesium Chloride Aqueous Solution)

A system 2 for producing a magnesium chloride aqueous solution has a decarbonizing unit 61 and a separating unit 62 as the pre-processing unit 60.

The separating unit 62 is provided between the decarbonizing unit 61 and the crystallization unit 10. The separating unit 62 is connected to the decarbonizing unit 61 via the pipeline P21. In addition, the separating unit 62 is connected to the crystallization unit 10 via the pipeline P22.

The separating unit 62 is a reverse osmosis membrane configured to separate pure water PW from the water to be treated L61 from which carbonic acids are reduced in the decarbonizing unit 61. The separating unit 62 generates water to be treated (water to be treated L62) obtained by separating the pure water PW from the water to be treated L61. For this reason, in the system 2 for producing a magnesium chloride aqueous solution having the separating unit 62, it is possible to produce the pure water PW together with the magnesium chloride aqueous solution.

The water to be treated L62 is supplied to the crystallization unit 10 via a pipeline P62. The processing on the downstream side of the crystallization unit 10 is performed as described in the first embodiment.

In addition, at least some of the pure water PW is supplied to a mixing unit 70 provided in the pipeline P4 via a first supply pipe P63. In the embodiment, the mixing unit 70 is a place to which the pipeline P4 and the first supply pipe P63 are connected.

In the pipeline P4, the reaction liquid L4 and the pure water PW are mixed, and a concentration of the reaction liquid L4 is lowered. Accordingly, a processing load in the acid-alkali generation unit 40 is reduced. In addition, since the pure water PW is used in dilution of the reaction liquid L4, in the acid-alkali generation unit 40, scale components such as calcium sulfate, calcium hydroxide, and the like are less likely to precipitate, and a stable continuous operation becomes possible.

Further, while the mixing unit 70 is a connecting place between the pipeline P4 and the first supply pipe P63 in the embodiment, a mixing tank configured to mix the reaction liquid L4 and the pure water PW may be provided as the mixing unit along a route of the pipeline P4.

The system 2 for producing a magnesium chloride aqueous solution having the above-mentioned configuration also enables the magnesium chloride aqueous solution to be produced while the costs related to chemicals are reduced in comparison with the method in the related art.

Third Embodiment

Figure 3:
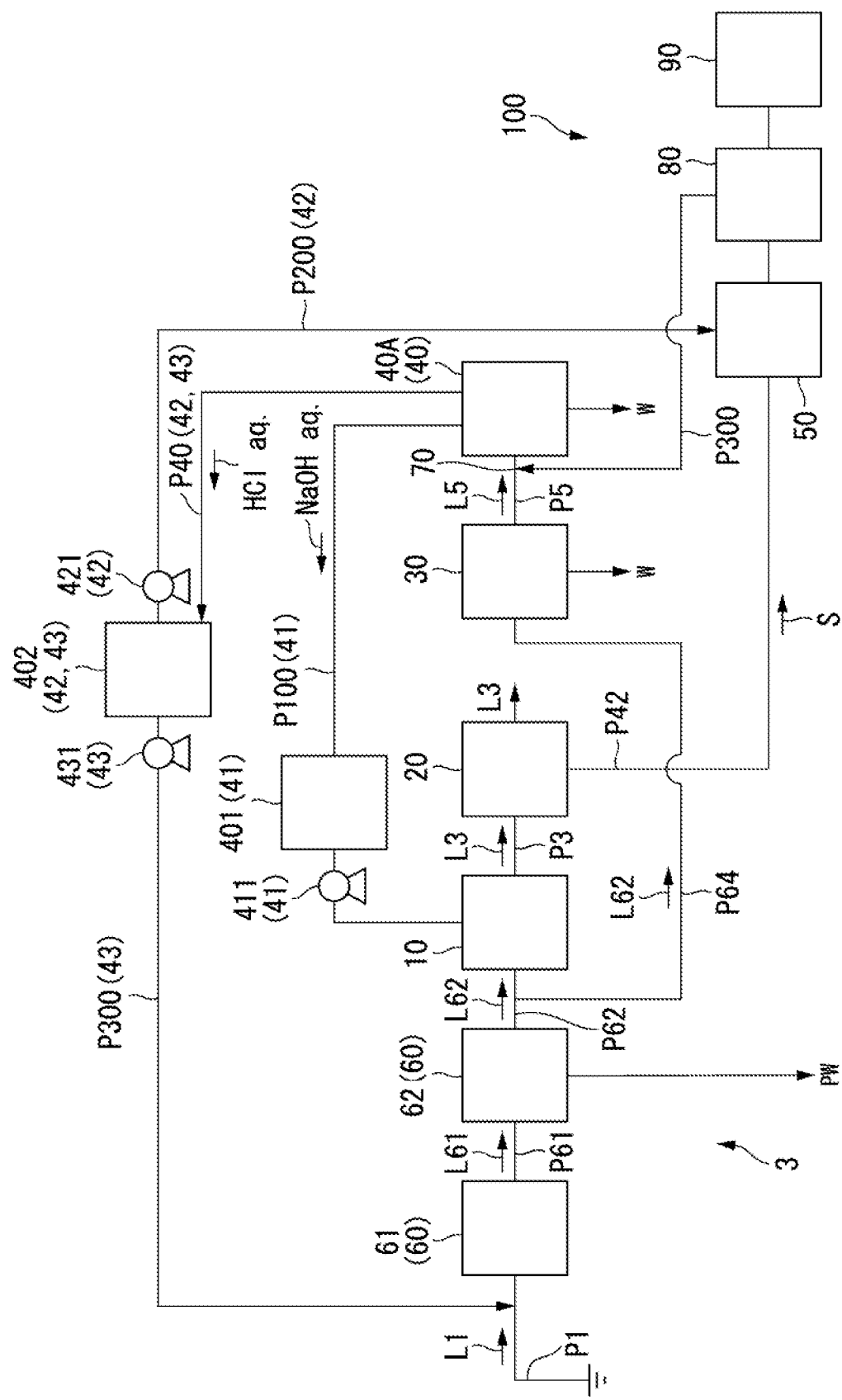
FIG. 3 is a view for describing a system for producing a magnesium chloride aqueous solution and a system for producing magnesium according to a third embodiment of the present disclosure.

FIG. 3 is a view for describing a system for producing a magnesium chloride aqueous solution and a system for producing magnesium according to a third embodiment of the present disclosure. In the embodiment, the same components as those described in the first and second embodiments are designated by the same reference signs, and detailed description thereof will be omitted.

(System for Producing Magnesium Chloride)

A system 3 for producing magnesium chloride aqueous solution has the decarbonizing unit 61 and the separating unit 62, as the pre-processing unit 60.

In addition, in the removal unit 30, a part of the water to be treated L62 generated in the separating unit 62 other than the separated liquid L3 generated in the precipitation unit 20 is supplied to the removal unit 30 via a pipeline P64. In the system 3 for producing magnesium chloride aqueous solution, the separated liquid L3 generated in the precipitation unit 20 is discarded.

While the separated liquid L3 has a lower concentration than that of the recovered slurry S, Mg(OH)$_2$ particles may be dispersed in the liquid. For this reason, when the separated liquid L3 is processed in the removal unit 30, there is a concern that Mg(OH)$_2$ particles will be locked in the removal unit 30 and performance of the removal unit 30 will deteriorate.

On the other hand, since there is no Mg(OH)$_2$ particles dispersed in the liquid like the separated liquid L3 in the water to be treated L62, the performance of the above-mentioned the removal unit 30 can be suppressed from deteriorating, and a stable operation can be performed for a long period of time.

(System for Producing Magnesium)

A system 200 for producing magnesium has a second supply pipe P81 configured to supply water W1 separated from the magnesium chloride aqueous solution in the generation unit 80 to the mixing unit 70. The water W1 is, for example, water (pure water) evaporated from the magnesium chloride aqueous solution in the generation unit 80.

In the pipeline P4, the reaction liquid L4 and the water W1 are mixed, and a concentration of the reaction liquid L4 is decreased. Accordingly, a processing load in the acid-alkali generation unit 40 is decreased. In addition, when the reaction liquid L4 is diluted, scale components such as calcium sulfate, calcium hydroxide, and the like, in the acid-alkali generation unit 40 are less likely to precipitate, and a stable continuous operation becomes possible.

Even in the system 3 for producing magnesium chloride aqueous solution having the above-mentioned configuration, it is possible to produce the magnesium chloride aqueous solution while the costs related to chemicals is reduced in comparison with the method in the related art.

In addition, even in the system 200 for producing a magnesium aqueous solution having the above-mentioned configuration, it is possible to produce the magnesium aqueous solution while the costs related to chemicals are reduced in comparison with the method in the related art.

Although the preferred embodiments of the present disclosure have been described above with reference to the accompanying drawings, the present disclosure is not limited to such examples. The various shapes and combinations and the like of the constituent members shown in the above-mentioned examples are examples and can be variously changed on the basis of design requirements and the like without departing from the gist of the present disclosure.

For example, in the embodiment, while the separating unit 62 is provided behind the decarbonizing unit 61 as the configuration of the pre-processing unit 60, the decarbonizing unit 61 may be provided behind the separating unit 62.

In addition, in the pre-processing unit 60, only the separating unit 62 may be provided.

Further, the pre-processing unit 60 may be omitted.

SUPPLEMENTARY NOTES

The system for producing a magnesium chloride aqueous solution disclosed in each embodiment is ascertained, for example, as follows.

[1] The system for producing a magnesium chloride aqueous solution according to a first aspect includes the crystallization unit 10, the precipitation unit 20 connected to the crystallization unit 10, the removal unit 30 connected to the precipitation unit 20, the acid-alkali generation unit 40 connected to the removal unit 30, and the reaction unit 50 connected to the precipitation unit 20, the crystallization unit 10 crystallizes magnesium hydroxide by adding sodium hydroxide aqueous solution to the water to be treated L1 using sea water as a raw material, and generates the reaction slurry L2 in which particles of the magnesium hydroxide are dispersed, the precipitation unit 20 stores the reaction slurry L2 precipitates particles, and separates the reaction slurry L2 into the recovered slurry S containing the particles at a high concentration and the separated liquid L3 containing the particles at a low concentration, the removal unit 30 removes divalent cations from the water to be treated L1 or the separated liquid L3 to generate the reaction liquid L4, the acid-alkali generation unit 40 generates a sodium hydroxide aqueous solution and hydrochloric acid from the reaction liquid L4, the reaction unit 50 adds the hydrochloric acid to the recovered slurry S to generate a magnesium chloride aqueous solution, and the acid-alkali generation unit 40 has the main body section 40A configured to generate a sodium hydroxide aqueous solution and hydrochloric acid from the reaction liquid L4, the first connection unit 41 configured to connect the main body section 40A and the crystallization unit 10 and supply the sodium hydroxide aqueous solution to the crystallization unit 10, and the second connection unit 42 configured to connect the main body section 40A and the reaction unit 50 and supply the hydrochloric acid to the reaction unit 50.

According to the aspect, it is possible to generate the hydrochloric acid and the sodium hydroxide aqueous solution in the acid-alkali generation unit 40 and supply them to the crystallization unit 10, the reaction unit 50 and the decarbonizing unit 61. Accordingly, in the system for producing a magnesium chloride aqueous solution, it is possible to reduce the costs related to chemicals in comparison with the method in the related art.

[2] The system for producing magnesium chloride aqueous solution according to a second aspect has the pre-processing unit 60 configured to obtain the water to be treated L1 from sea water, and the pre-processing unit 60 has the separating unit 62 configured to separate water from the water to be treated L1.

According to the aspect, it is possible to produce pure water together with the magnesium chloride aqueous solution.

[3] The system for producing magnesium chloride aqueous solution according to a third aspect has the mixing unit 70 provided along a route through which the reaction liquid L4 is supplied from the removal unit 30 to the acid-alkali generation unit 40, and configured to mix at least a part of the pure water PW and the reaction liquid L4, and the first supply pipe P63 configured to supply water from the separating unit 62 to the mixing unit 70.

According to the aspect, the reaction liquid L4 and the pure water PW are mixed with each other, and a concentration of the reaction liquid L4 is decreased. Accordingly, a processing load in the acid-alkali generation unit 40 is reduced. In addition, since the pure water PW is used in dilution of the reaction liquid L4, scale components such as the calcium sulfate, the calcium hydroxide, and the like, in the acid-alkali generation unit 40 are less likely to precipitate, and a stable continuous operation becomes possible.

[4] The system for producing a magnesium chloride aqueous solution according to a fourth aspect has the pre-processing unit 60 connected to the crystallization unit 10 upstream from the crystallization unit 10, the pre-processing unit 60 has the decarbonizing unit 61 configured to add hydrochloric acid to the water to be treated L1 and remove at least some carbonic acid contained in the water to be treated L1, and the acid-alkali generation unit 40 has the third connection unit 43 configured to connect the main body section 40A and the decarbonizing unit 61 and supply hydrochloric acid to the decarbonizing unit 61.

According to the aspect, carbonate is less likely to be generated in the process, and the system for producing a magnesium chloride aqueous solution can be operated stably for a long period of time.

In addition, the system for producing magnesium disclosed in each embodiment is ascertained, for example, as follows.

[5] The system for producing magnesium according to a fifth aspect has the system for producing a magnesium chloride aqueous solution of any one of the first to fourth aspects, the generation unit 80 configured to generate magnesium chloride by separating water from the magnesium chloride aqueous solution, and the electrolysis unit 90 configured to perform molten salt electrolysis of the magnesium chloride to obtain metal magnesium.

According to the aspect, it is possible to provide the system 100 for producing magnesium capable of reducing the costs related to chemicals in comparison with the method in the related art.

[6] The system for producing magnesium according to a sixth aspect has the mixing unit 70 provided along a route through which the reaction liquid L4 is supplied from the removal unit 30 to the acid-alkali generation unit 40, and configured to mix at least a part of the water W1 separated by the generation unit 80 with the reaction liquid L4, and the second supply pipe P81 configured to supply the water W1 separated by the generation unit 80 from the generation unit 80 to the mixing unit 70.

According to the aspect, the reaction liquid L4 and the water W1 are mixed with each other, and a concentration of the reaction liquid L4 is decreased. Accordingly, a processing load in the acid-alkali generation unit 40 is reduced. In addition, when the reaction liquid L4 is diluted, scale components such as calcium sulfate, calcium hydroxide, and the like, in the acid-alkali generation unit 40 are less likely to precipitate, and a stable continuous operation becomes possible.

REFERENCE SIGNS LIST 1, 2, 3 System for producing magnesium chloride aqueous solution
10 Crystallization unit
20 Precipitation unit
30 Removal unit
40 Acid-alkali generation unit
40A Main body section
41 First connection unit
42 Second connection unit
43 Third connection unit
50 Reaction unit
60 Pre-processing unit
61 Decarbonizing unit
62 Separating unit
70 Mixing unit
80 Generation unit
90 Electrolysis unit
100, 200 System for producing magnesium
L1, L61, L62 Water to be treated
L2 Reaction slurry
L3 Separated liquid
L4 Reaction liquid
P63 First supply pipe
P81 Second supply pipe
PW Pure water
S Recovered slurry
W1 Water

The invention claimed is:

1. A system for producing a magnesium chloride aqueous solution comprising:
a crystallization unit;
a precipitation unit connected to the crystallization unit;
a removal unit connected to the precipitation unit;
an acid-alkali generation unit connected to the removal unit; and
a reaction unit connected to the precipitation unit,
wherein the crystallization unit crystallizes magnesium hydroxide by adding a sodium hydroxide aqueous solution to water to be treated using seawater as a raw material, and generates reaction slurry in which particles of the magnesium hydroxide are dispersed,
the precipitation unit stores the reaction slurry to precipitate the particles, and separates the reaction slurry into a recovered slurry containing the particles at a high concentration and a separated liquid containing the particles at a low concentration,
the removal unit removes divalent cations from the water to be treated or the separated liquid to generate a reaction liquid,
the acid-alkali generation unit generates a sodium hydroxide aqueous solution and hydrochloric acid from the reaction liquid,
the reaction unit adds the hydrochloric acid to the recovered slurry and generates a magnesium chloride aqueous solution, and
the acid-alkali generation unit has:
a main body section configured to generate a sodium hydroxide aqueous solution and hydrochloric acid from the reaction liquid;
a first connection unit configured to connect the main body section and the crystallization unit and supply the sodium hydroxide aqueous solution to the crystallization unit; and
a second connection unit configured to connect the main body section and the reaction unit and supply the hydrochloric acid to the reaction unit.

2. The system for producing a magnesium chloride aqueous solution according to claim 1, wherein a pre-processing unit connected to the crystallization unit upstream from the crystallization unit is provided, and
the pre-processing unit has a separating unit configured to separate pure water from the water to be treated.

3. The system for producing a magnesium chloride aqueous solution according to claim 2, further comprising:
a mixing unit provided along a route through which the reaction liquid is supplied from the removal unit to the acid-alkali generation unit and configured to mix at least some of the pure water with the reaction liquid; and
a first supply pipe configured to supply the pure water from the separating unit to the mixing unit.

4. The system for producing a magnesium chloride aqueous solution according to claim 1, wherein a pre-processing unit connected to the crystallization unit upstream from the crystallization unit is provided, the pre-processing unit has a decarbonizing unit configured to add hydrochloric acid to the water to be treated and remove at least some carbonic acid contained in the water to be treated, and the acid-alkali generation unit has a third connection unit configured to connect the main body section and the decarbonizing unit and supply the hydrochloric acid to the decarbonizing unit.

5. A system for producing magnesium comprising:

the system for producing a magnesium chloride aqueous solution according to claim 1;

a generation unit configured to separate water from the magnesium chloride aqueous solution to generate magnesium chloride; and an electrolysis unit configured to perform molten salt electrolysis of the magnesium chloride to obtain metal magnesium.

6. The system for producing magnesium according to claim 5, further comprising:

a mixing unit provided along a route through which the reaction liquid is supplied from the removal unit to the acid-alkali generation unit and configured to mix at least some water separated by the generation unit with the reaction liquid; and a second supply pipe configured to supply the water separated by the generation unit from the generation unit to the mixing unit.

* * * * *